United States Patent [19]

Yano

[11] 4,439,781

[45] Mar. 27, 1984

[54] IMAGE RECORDING METHOD AND APPARATUS

[75] Inventor: Takashi Yano, Tokyo, Japan

[73] Assignee: Ricoh Company, Ltd., Japan

[21] Appl. No.: 286,879

[22] Filed: Jul. 27, 1981

[30] Foreign Application Priority Data

Jul. 28, 1980 [JP] Japan ........ 55-103266
Sep. 24, 1980 [JP] Japan ........ 55-132514

[51] Int. Cl.[3] ........ G01D 15/06
[52] U.S. Cl. ........ 346/153.1
[58] Field of Search ........ 346/153.1, 155, 1.1

[56] References Cited

U.S. PATENT DOCUMENTS

| | | | |
|---|---|---|---|
| 3,528,073 | 9/1970 | Starr, Jr. | 346/155 |
| 3,701,996 | 10/1972 | Perley | 346/153.1 |
| 3,946,402 | 3/1976 | Lunde | 346/153.1 |
| 4,118,710 | 10/1978 | Tomita et al. | 346/153.1 |

*Primary Examiner*—Thomas H. Tarcza
*Attorney, Agent, or Firm*—Guy W. Shoup; Gerard F. Dunne

[57] ABSTRACT

A thin toner layer is uniformly formed on a donor member and is brought into contact with a recording electrode to which an image signal is applied, thereby forming a charge pattern in accordance therewith, which is subsequently transferred onto a transfer sheet. The thin toner layer is formed by an applicator disposed close to or in contact with the donor member and including a toner carrier to which a voltage is applied with respect to the donor member. To prevent the background smearing, the recording electrode is provided with a triboelectric charging member or auxiliary electrode, disposed on its surface which is adapted to contact the toner, for charging the toner to the opposite polarity from that of the charging by the recording electrode.

12 Claims, 20 Drawing Figures

IMAGE RECORDING METHOD AND APPARATUS

BACKGROUND OF THE INVENTION

The invention relates to an image recording method in which a charge pattern is directly formed on a toner layer of a donor by utilizing a multi-stylus electrode, which toner layer is subsequently transferred onto a transfer sheet to produce an image, and an apparatus used for carrying out the method.

A recording method is known in the prior art in which an image signal is applied to a multi-stylus electrode for selectively charging or discharging the surface of a latent image carrier to form an electrostatic latent image in accordance with the image signal, which is then converted into a visual image by the use of toner which can be transferred onto a record sheet. The known method suffers from the problem which results from the fact that the multi-stylus electrode is disposed in contact with or in the close vicinity of the surface of the latent image carrier. If any toner remaining after the transfer step of a preceding operation is deposited on the multi-stylus electrode, the recorded image can be adversely influenced. Hence, it is necessary that the latent image carrier be sufficiently cleaned after the transfer of the visual image. However, a satisfactory cleaning operation is usually difficult to achieve if the carrier is to have a prolonged life.

A recording method has been proposed to avoid such problem, and utilizes a counter electrode, referred to as a donor, which has its surface covered with a toner and which is disposed in opposing relationship with the multi-stylus electrode with a given small gap therebetween. A record sheet is passed between these electrodes while applying an image signal to the multi-stylus electrode, thus producing a local electric field extending through the record sheet in accordance with the image signal. The electric field acts to transfer the toner from the donor onto the surface of the record sheet, thereby forming a visual image thereon. With this method, contamination of the multi-stylus electrode by the toner is avoided because of the presence of the record sheet between the donor and the multi-stylus electrode. However, this method suffers from the problem that the sharpness of the visual image may be degraded depending on the thickness of the record sheet since the multi-stylus electrode is located on the rear side thereof. In addition, the multi-stylus electrode is subject to a discharge, generally a spark discharge, which causes an erosion of the electrode, thus preventing its use over a prolonged period of time.

To cope with this problem, the present inventor has previously proposed a recording method comprising the steps of uniformly forming a thin toner layer, having an increased resistivity to maintain the charge thereon, on the surface of a moving donor member, disposing a multi-stylus electrode to which a pattern signal is applied in contact with the toner layer to form a charge pattern in accordance with the pattern signal, and then disposing a record medium in superimposed relationship with the toner layer to transfer the toner according to the charge pattern onto the record medium. In this earlier invention, the steps of forming the thin toner layer uniformly on the surface of the donor member can be achieved by resiliently urging a metal doctor against the surface of the donor member which itself has a certain resilience. However, with this technique, it is difficult to produce a uniform pressure between the surface of the donor member and the doctor, resulting in a number of drawbacks including the failure of forming a uniform thickness of the toner layer, non-uniformity in the optical density of the transferred image, and the generation of undesirable stresses produced in the toner as a result of the pressure between the donor member and the doctor under a force of friction applied by the doctor to cause a fracture of toner during a prolonged period of use or a solid adherence of toner to the surface of the donor member, producing abnormalities in a transferred image.

SUMMARY OF THE INVENTION

In accordance with the invention, there is provided a recording method which is characterized by performing the step of uniformly forming a thin toner layer on the surface of the donor member as cited in the earlier invention by utilizing an applicator including a toner carrier disposed in close vicinity of or in contact with the surface of the donor member and to which a voltage is applied with respect to the donor member. The applicator is constructed substantially in the same manner as a developing unit which uses a toner as a developing agent. A toner on a toner carrier is carried out to the surface of the donor member under the action of an electric field which is produced between the toner carrier and the donor member. In the recording method of the invention, a uniformly thin toner layer can be reliably formed on the surface of the donor member, thereby enabling a sharp image to be produced which is free from non-uniformity in the optical density.

Therefore, it is an object of the invention to provide a recording method representing an improvement of the earlier invention and which enables a sharp image free from non-uniform optical density to be obtained.

Other objects and features of the invention will become apparent from the following description with reference to the drawings.

DESCRIPTION OF PREFERRED EMBODIMENTS

Figure 1:
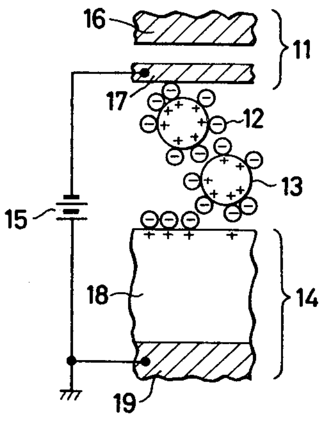
FIGS. 1 to 5 are schematic views illustrating different techniques for uniformly forming a thin toner layer on a donor member according to the recording method of the invention.
Figure 2:
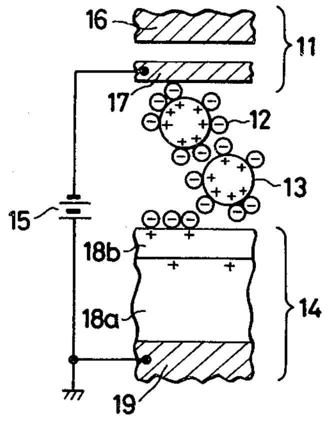

FIGS. 1 to 5 schematically illustrate several techniques for unformly forming a thin toner layer in accordance with the invention. In these figures numeral 11 represents an applicator, 12 toner, 13 carrier for the toner 14*a*, donor member, and 15*a* bias source. The applicator 11 comprises a magnet 16, and a non-magnetic member 17 while the donor member 14 is comprised of a conductive rubber portion 18 and a conductive substrate 19. Assuming that the toner 12 is charged to the negative polarity, the bias source 15 has its negative terminal connected to the non-magnetic member 17 of the applicator 11 and its positive terminal connected to the conductive substrate 19 of the donor member 14, which is in turn connected to the ground. In FIG. 1, the non-magnetic toner 12 is charged to the negative polarity by the triboelectric action with the magnetic carrier 13. On the other hand, a positive charge from the bias source 15 is injected into the conductive rubber portion 18 through the conductive substrate 19 of the donor member 14. As a result, the toner 12, which is charged to the negative polarity, is electrostatically attracted to the surface of the conductive rubber portion 18, which is charged to the positive polarity. The toner is uniformly deposited on the surface of the conductive rubber portion 18 as a result of an electric field directed from the conductive rubber portion 18 toward the non-magnetic member 17, which is produced by the bias source 15.

Generally, in a two-component developer utilizing a carrier, the toner has a relatively high volume resistance on the order of $10^{14}$ ohm-cm while the volume resistance of the toner of one-component developer is relatively low, on the order of $10^{8}$ to $10^{10}$ ohm-cm. If the toner has a high resistivity, its effective resistance can be reduced by pressure resulting from the developer being packed between the applicator and the donor member. In this instance, and also when the toner has a reduced resistivity, the toner on the donor member may lose some of its charge, and the toner layer may be formed to an excessive thickness, reducing its adherence to the donor member. On the other hand, the conductive rubber portion 18 on the surface of the donor member has a volume resistance which is high in comparison to metal, but has a resilience and also has a minute unevenness in its surface, increasing the area of contact with the toner to assist in providing a leakage path for the charge on the toner. Recognizing this fact, in the techniques illustrated in FIGS. 2 to 5, the donor member 14 is shown as comprising a first conductive rubber layer 18*a* of a relatively low resistivity and a second conductive rubber layer 18*b* of a relatively high resistivity both formed on the conductive substrate 19. The first layer is also formed of rubber to provide a given magnitude of resilience. Such arrangement may be subdivided into an increased number of layers provided the surface layer has a volume resistance which is higher than that of its underlying layer. If the effective resistivity of the toner is reduced under the conditions of use or if the toner has a low resistivity, the relatively high volume resistance on the surface of the donor member prevents the charge on the toner from leaking through the surface of the donor member. Conversely, the negative charge on the toner induces a positive charge on the surface of the donor member to be trapped thereby, thus increasing the adherence of the toner.

Figure 3:
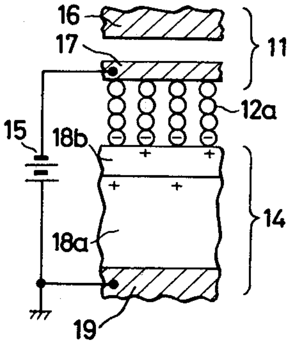
Figure 4:
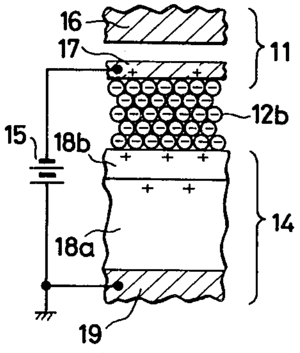
Figure 5:
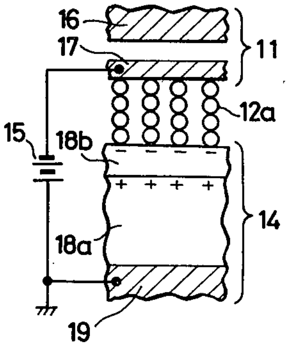

In the embodiment of FIG. 3, the toner comprises a one-component magnetic toner 12*a* having a relatively low resistivity. The charge of the positive polarity on the surface of the donor member induces a negative charge on the toner 12*a*, which remains attached to the surface of the donor member. In the embodiment shown in FIG. 4, the toner comprises a one-component magnetic toner 12*b* having a relatively high resistivity, which is charged to the negative polarity as a result of its triboelectric action with the non-magnetic member 17 or a charge injection from a doctor to which a voltage, not shown, is applied and which is carried through the non-magnetic member 17, and remains attached to the surface of the donor member. FIG. 5 illustrates a less desirable example in which the surface layer 18*b* of the donor member comprises an insulating rubber, for example, silicone rubber in which carbon is not mixed, for use with a magnetic toner 12*a* having a relatively low resistivity. In this instance, a repeated use causes an accumulation of a negative charge on the surface of the donor member, preventing a charging of the toner and its attachment to the surface of the donor member. In addition, a disadvantage is experienced in that an effective field is not applied to the toner layer when it is disposed in opposing relatinship with a multi-stylus electrode, thus preventing a satisfactory formation of an image.

The described techniques have been carried out utilizing an applicator 11 which comprises a non-magnetic member 17 having a magnet 16 disposed therein in combination with a two-component developer including a magnetic carrier 13 and a non-magnetic toner 12 as well as one-component magnetic toners 12*a*, 12*b*. However, one-component non-magnetic toner may also be used. Also the toner carrying surface of the applicator may be formed by a conductive rubber. In this instance, the adherence of the non-magnetic toner to the toner carrying surface is provided by the adherence between both of the surfaces or by the van der Waal's force. The applicator and the donor member may be disposed in contact with each other.

Figure 6:
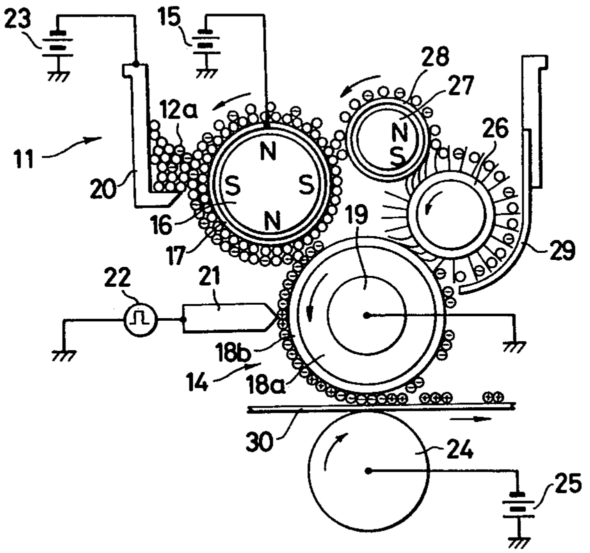
FIGS. 6 and 7 are schematic views illustrating different embodiments of apparatus for carrying out the recording method of the invention.

FIG. 6 is a pictorial illustration of an apparatus used for carrying out the recording method of the invention. The applicator 11 comprises a sleeve 17 formed of a non-magnetic material such as aluminium and which rotates in the counterclockwise direction, a stationary magnet 16 disposed inside the sleeve 17, and an L-shaped doctor 20 formed of a conductive material such as aluminium and having its free end disposed close to the surface of the sleeve 17. The doctor 20 also serves as a simplified hopper, containing one-component magnetic toner 12*a* having a relatively low resistivity represented by a volume resitance of $10^8$ ohm-cm therein. It will be appreciated that the particles of the toner 12*a* are exaggerated for purpose of illustration. A donor roller 14 is disposed close to the surfce of the sleeve 17, preferably at a distance of 0.5 mm, so as to be rotatable in the counterclockwise direction. An endless donor belt may be substituted for the donor roller. The donor roller 14 includes a conductive arbor 19, a first conductive rubber layer 18*a* having a volume resistance of $10^3$ ohm-cm and a thickness of 7 mm and a second conductive rubber layer 18*b* having a volume resistance of $10^7$ ohm-cm and a thickness of 1 mm. These conductive rubbers comprise a silicone rubber admixed with carbon. The tip of a recording electrode 21 is disposed in contact with the surface of the donor roller 14, and is connected to a source of a pattern signal 22 which can vary between a positive limit of 200 V and a negative limit of 100 V. The opposite end of the source is connected to ground. A bias source 15 is connected between the donor roller 14 and the sleeve 17 of the applicator, thereby applying a voltage of −300 V to the sleeve. A voltage of −300 V is also applied to the doctor 20 from a source 23 to eliminate any potential difference between the sleeve and the doctor. Disposed in abutment against the surface of the donor roller 14 is a transfer roller 24 formed of a metal such as stainless steel or aluminium, which is disposed so as to be rotatable in the clockwise direction with the same peripheral speed as the donor roller 14. A voltage of −200 V is applied to the transfer roller 24 from a source 25 connected thereto. In addition, a brush carried by a cleaning roller 26 is disposed in contact with the surface of the donor roller 14, the roller 26 being rotatable in the counterclockwise direction. The brush is also engaged by an intermediate sleeve 28 having a stationary magnet 27 disposed in its interior and rotatable in the counterclockwise direction, the sleeve 28 being disposed close to the sleeve 17 of the applicator. The side of the cleaning roller 26 remote from the donor roller 14 is closed by a cover 29, which defines an applicator unit together with the doctor 20.

In operation, the magnetic toner 12*a* is attracted to the surface of the sleeve 17, which is rotating counterclockwise, under the magnetic attraction of the magnet 16 contained in the applicator 11, and the thickness of the toner layer on the sleeve 17 is controlled by the free end of the doctor 20. The surface toner layer on the sleeve 17 is charged to the negative polarity by the bias source 15, whereby the surface toner layer on the sleeve 17 is uniformly carried over to the surface of the donor roller 14. The negatively charged toner layer on the donor roller 14 is subject to the action of the recording electrode 21, which selectively applies a positive pulse signal corresponding to an image signal, thus forming an electrostatic latent image which is defined by positive toner. A record sheet 30 is fed into the nip between the donor roller 14 and the transfer roller 24, to which a negative voltage is applied, whereby only the positive toner is transferred onto the record sheet 30. As a result, only the negative toner remains on the donor roller 14 and is then scraped off by the cleaning roller 26. The negative toner deposited on the brush of the cleaning roller is subsequently carried over to the surface of the intermediate sleeve 28 under the magnetic attraction of the magnet 27 which is disposed inside the sleeve 28, and thence carried over to the sleeve 17 of the applicator. In the meantime, a majority of the negative charge on the toner is lost.

A similar result is obtained with this apparatus when the one-component magnetic toner 12*a* having a relatively low resistivity is replaced by one-component magnetic toner having a relatively high resistivity (volume resistance of $10^{10}$ ohm-cm) and a voltage of −300 V is applied to the sleeve 17 of the applicator while a voltage of −600 V is applied to the doctor 20. In this instance, a negative charge is applied to the toner layer on the sleeve 17 as a result of charge injection from the doctor 20. Where a styrene toner is employed, the toner can be charged to a negative polarity by friction with an aluminium doctor. Hence, the triboelectric charging process may be used in combination with the charge injection process to charge the toner. Alternatively, the toner may be charged by friction with the sleeve 17.

Figure 7:
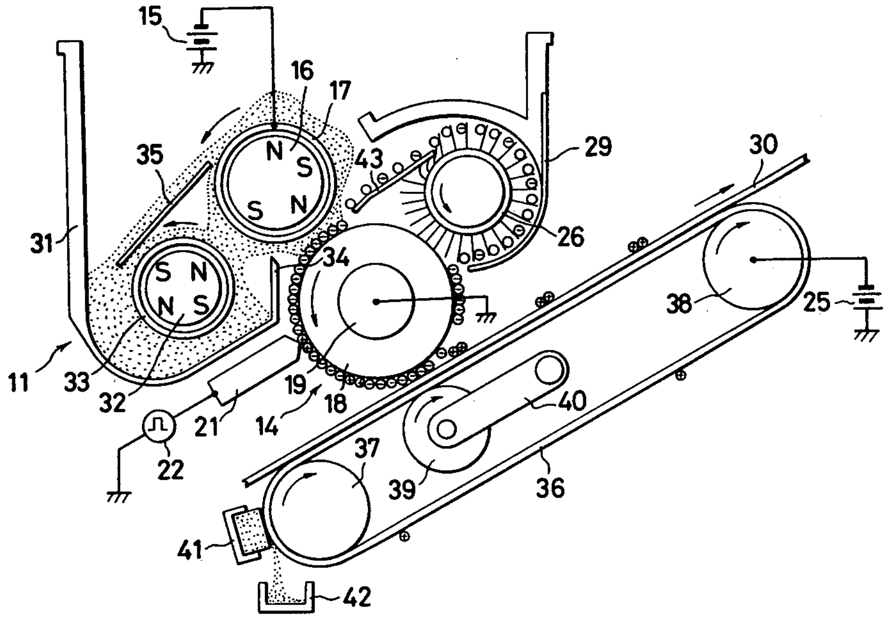

FIG. 7 shows another embodiment of the apparatus for carrying out the recording method of the invention. The applicator 11 remains substantially the same as a magnetic brush developing unit which utilizes a two-component developer, and comprises a magnet 16 and sleeve 17 constructed in the same manner as mentioned above in connection with the preceding embodiment, a hopper 31 which is hook-shaped in cross section, and a combination of a magnet 32 and replenishing sleeve 33 which is similarly constructed as the magnet 16 and the sleeve 17. The free end or hook end of the hopper 31 is formed as a doctor 34. A scraper blade 35 is disposed close to the surface of the sleeve 17. A developer powder 36 which is similar to a two-component developer and comprising a mixture of a non-magnetic toner having a relatively high resistivity represented by a volume resistance of $10^{14}$ ohm-cm and a magnetic carrier, is disposed within the hopper 31, and the toner is charged to the negative polarity by friction with the carrier. The toner and the carrier attract each other, and are carried to the surface of the sleeve 17 by the action of the replenishing sleeve 33, and the thickness of the layer of toner and carrier is controlled by the doctor 34. A donor roller 14 comprises an arbor 19 and a conductive rubber layer 18 having a volume resistance of $10^5$ ohm-cm and a thickness of 8 mm which is disposed as a coating on the arbor. A power source 15 is connected between the sleeve 17 and the donor roller, whereby a voltage of −200 V is applied to the sleeve 17. While both the carrier and the toner are carried by the sleeve 17, only the negative toner is deposited on the donor roller 14 while the carrier is removed from the sleeve 17 by the scraper blade 35. The negatively charged toner which is carried over to the donor roller forms a uniform toner layer thereon, which is then subject to the action of a recording electrode 21, which selectively applies an image signal which can vary between a positive limit of 200 V and a negative limit of 100 V, thereby forming an electrostatic latent image corresponding to an image by the positively charged toner.

A transfer belt 36 is formed of a conductive material such as stainless steel or nickel, and extends around a pair of conductive support rollers 37, 38 to be driven thereby. A backup roller 39 is supported by a rocking lever 40 so as to be located opposite to the donor roller 14 at a point inside the transfer belt 36. The rocking lever 40 is driven by a solenoid, not shown, so that the backup roller 39 is normally spaced from the belt 36 but can be brought into abutment against the donor roller 14 through the belt 36 interposed therebetween only when the solenoid is energized or during a transfer operation. A cleaner 41 is disposed in abutment against one of the support rollers, 37, through the belt 36 interposed, with a toner recovery tray 42 disposed therebelow. A voltage of −200 V is applied to the other support roller 38 from a power source 25.

The positively charged toner on the donor roller 14 which defines the latent image is transferred onto a record sheet 30 which is passed between the donor roller 14 and the transfer belt 36 to which a negative voltage is applied, thus converting the latent image by the roller 38 into a visual image. Any toner which becomes deposited on the belt portions other than the record sheet 30 is removed by the cleaner 41 to be collected in the tray 42. The negatively charged toner which remains on the donor roller 14 is scraped off by the cleaning roller 26 in the same manner as mentioned above, and the toner is thence removed by a striker blade 43 to be returned onto the donor roller 14 again, thus participating in the formation of another uniform toner layer. As before, the cleaning roller 26 is enclosed in a cover 29, which, together with the hopper 31 disposed on the opposite side, define an applicator unit.

Figure 8:
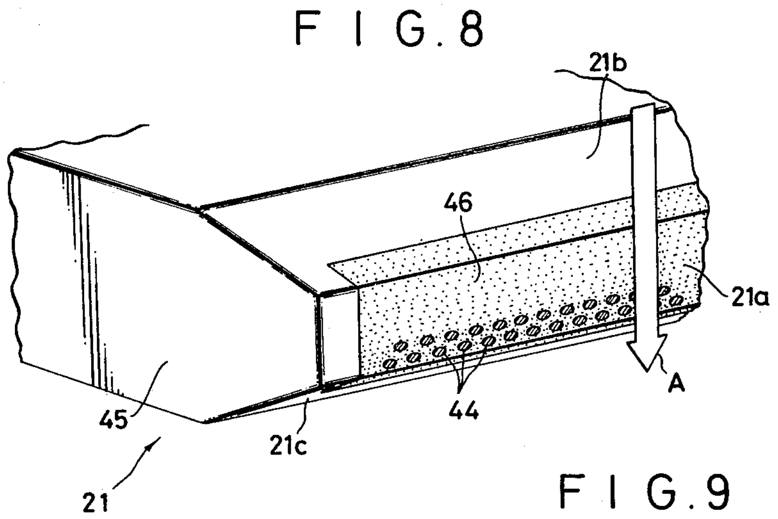
FIG. 8 is a fragmentary perspective view of a recording electrode used in the recording apparatus of the invention.
Figure 9:
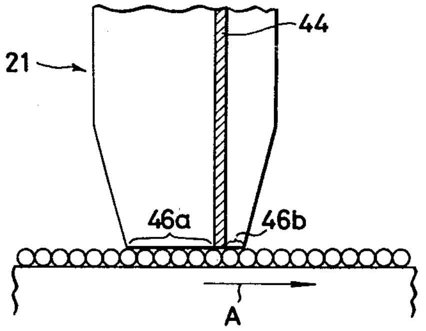
FIG. 9 is a fragmentary cross section of a recording electrode which is used in the recording apparatus of the invention, in conjunction with the surface of a donor member.

FIG. 8 shows one embodiment of a recording electrode used in the invention. A recording electrode 21 comprises a multi-stylus electrode 44 and a support 45 therefor. A portion of the support 45 which is located in surrounding relationship with the multi-stylus electrode 44 is indicated by numeral 46 and is formed of an insulating resin. The tip end of the recording electrode 21 has an end face 21*a* which extends parallel to the direction of movement of a donor roller, and which is defined between a pair of oppositely located bevelled surfaces 21*b*, 21*c*. Consequently, the end of the multistylus electrode 44 and the insulating resin 46 are formed to be coplanar. In FIG. 8, a block arrow A indicates the direction in which a toner is conveyed by a donor roller. The individual styli of the electrode 44 are staggered in a pair of rows extending in a direction perpendicular to the toner conveying direction A. In addition, the multi-stylus electrode 44 is located at an advanced position, as viewed in the toner conveying direction A, rather than centrally in the end face 21*a*. Thus, referring to FIG. 9, it will be seen that the support 45 has a leading portion 46*a* located before the multi-stylus electrode 44 and having an increased area in order to provide a required strength and to prevent a separation of toner, and a lagging portion 46*b* located behind the electrode 44 and having a relatively small area.

In an experiment using such electrode, there resulted in an image having a background smearing. An investigation revealed that a charge may be applied to the toner by triboelectric action provided by the end face of the support 45. The possibility exists, therefore, that the charge removed by the lagging portion 46*b* from the toner that has been charged by the multi-stylus electrode 44 is small, but that the portion of the toner which has not yet been charged by the multi-stylus electrode 44 may be charged by the triboelectric action of the leading support portion 46*a* to a level which causes some of it to be transferred onto a record sheet during a transfer step, causing a background smearing. A background smearing also occurs by a similar triboelectric action of the lagging support portion 46*b* as well as the support region located among the individual styli of the electrode, though their effect is reduced as compared with that produced by the leading support portion 46*a*.

For the reason mentioned above, in accordance with the invention, the resin material used to form the portion 46 of the support 45 is chosen to be spaced from and has a given order relative to the resin used in the toner, as considered in the triboelectric series, so as to charge the toner to a given polarity. More specifically, the choice is made such that the toner is charged to the opposite polarity from that to which it is charged by the multi-stylus electrode 44. By way of example, where St/n-BMA (styrene/n-butyl methacrylate resin) is used for the toner and the latter is triboelectrically charged tothe negative polarity, the support may utilize MMA (methyl methacrylate resin).

Since the multi-stylus electrode 44 is located at an advanced position, as viewed in the toner conveying direction, in the end face 21*a* of the support 45, the toner on the donor roller is initially brought into contact with the insulating resin 46, and then into contact with the multi-stylus electrode 44. Consequently, the toner is charged by the resin 46 in the leading portion thereof to the opposite polarity from that which is used to form an image, and is subsequently recharged selectively to the opposite polarity by the electrode 44. As a result of such process, any fraction of toner which remains non-charged is substantially eliminated. In addition, if the toner which has been charged by the resin 46 happens to move past the multi-stylus electrode 44 without being subject to the charging action thereof, such toner cannot migrate onto the record sheet under the action of the static transfer field, but rather moves in the opposite direction, thus overcoming the problem of the background smearing without accompanying any adverse influence upon the optical density of the image. The influence of the charge on the toner and the proportion of that faction of the toner which is not properly charged is greater upon a non-image region or the background than upon the optical density of the image region which exhibits a saturation response. Accordingly, a good image results as a consequence of considering the significant of a non-image region.

Figure 10:
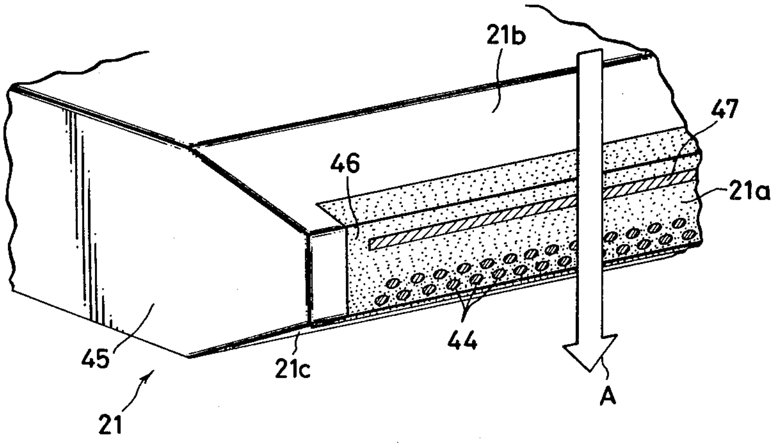
FIG. 10 is a fragmentary perspective view of another form of recording electrode which may be used in the recording apparatus of the invention.

FIG. 10 shows another embodiment of recording electrode which may be used in the recording apparatus of the invention. This embodiment differs from the previous embodiment in the provision of means for charging the toner before the charging action by the multi-stylus electrode. Specifically, a multi-stylus electrode 44 and an auxiliary electrode 47 are juxtaposed in the end face 21*a* of the support 45. Thus, these two electrodes are spaced by a given distance from each other and extend parallel to each other in a direction perpendicular to the toner conveying direction A. The electrodes 44, 47 are surrounded by an insulating resin 46. In the previous embodiment, the resin material has been chosen to assure a positive triboelectric charging of the toner by contact therewith. However, in the present embodiment, the choice of the material is not so stringent but is replaced by the action of auxiliary electrode 47. Specifically, the auxiliary electrode is in the form of a strip-shaped electrode extending in the direction perpendicular to the toner conveying direction A, and has a given voltage applied thereto for charging the toner on the donor roller before the charging action by the multi-stylus electrode 44 takes place. The voltage applied to the auxiliary electrode 47 is of the opposite polarity from the polarity of the voltage applied to the multi-stylus electrode 44. Where such auxiliary electrode is used, the voltage of the opposite polarity on the order of +100 V may be applied to the donor roller to further reduce the background smearing since the toner is negatively charged when the recording electrode is turned off or connected to the ground.

Figure 11:
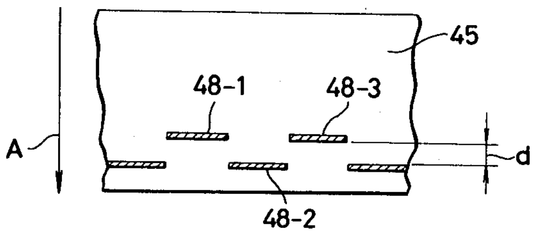
FIGS. 11 and 12 are schematic views illustrating different arrays of individual electrodes of the recording electrode used in the recording apparatus of the invention.
Figure 12:
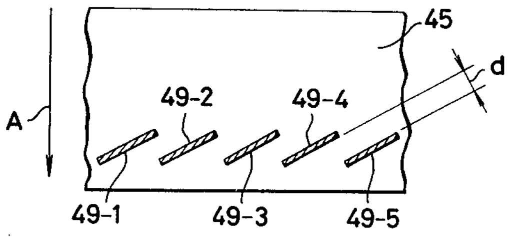

FIGS. 11 and 12 show further embodiments of the recording electrode used in the invention. In the embodiments described above, the recording electrode comprises a multi-stylus electrode including a staggered array. However, the use of such multi-stylus electrode requires the provision of a buffer memory, resulting in a complex arrangement for the drive circuit of the stylus electrode. By contrast, if the individual electrodes are disposed in a row, the drive circuit therefor will be simplified. However, because no entry is made between the individual electrodes, the apparent optical density of the image will be degraded. To accommodate for this, the individual electrodes may be formed in an elongated form, as shown in FIG. 11, thereby reducing the spacing therebetween in the staggered arrays and permitting the individual electrodes to be treated as disposed in a row. In this manner, the described problem is overcome. Specifically, the plate-shaped electrodes 48-1, 48-2, 48-3, . . . may be disposed alternately in upper and lower rows so as to reduce an overlap therebetween, and they can be treated as a single row arrangement when in fact they are disposed in staggered arrays. The distance between the upper and the lower electrode 48-1, 48-2 is chosen to be equal to 45 micons so as to prevent an aerial discharge across the electrodes from occurring. An offset of this order presents no practical problems whatsoever with respect to the image.

The same principle may be implemented by an array of plate-shaped electrodes 49-1, 49-2, 49-3, 49-4, 49-5, . . . disposed along a direction perpendicular to the toner conveying direction A and at an angle thereto, as shown in FIG. 12, which may be considered as a single row array. The distance d between the adjacent electrodes, for example, between the electrodes 49-4 and 49-5 is suitably chosen to be equal to 45 microns. A recording electrode having such an array of electrodes may be manufactured by the use of a winding jig for the stylus electrode having a saw-toothed surface configuration and about which an electrode wire is disposed. Such an arrangement is preferred in reducing the spacing between adjacent electrodes and the area of the support which is located downstream of the electrodes.

When the free end of the recording electrode has the first and the second bevelled surface 21*b*, 21*c*, a deposition of toner may occur on the first bevelled surface 21*b*. If the amount of deposition increases, such toner may disrupt the toner layer formed on the donor roller. The disruption of the toner layer eventually results in a disturbance caused to the toner image formed on the record sheet, preventing the formation of a sharp toner image. Also, a deposition of toner on the second bevelled surface 21*c* may result in the difficulty that the charge pattern of the toner layer formed on the donor roller may be disrupted by the charge of the deposited toner or the deposited toner itself, again disadvantageously reducing the resolution of the toner image formed on the record sheet. It will be readily apparent that a similar inconvenience may be caused when the free end of the multi-stylus electrode is shaped in a form other than specifically illustrated herein.

According to a further aspect of the invention, such inconvenience is eliminated by disposing the recording electrode 21 in a rockable manner so that the location of the free end of the multi-stylus electrode which abuts against the toner layer on the donor roller may change from time to time. Specifically, referring to FIG. 13, the recording electrode 21 is angularly movable about a point O which is spaced from the free end 21*a* of the recording electrode.

Figure 13:
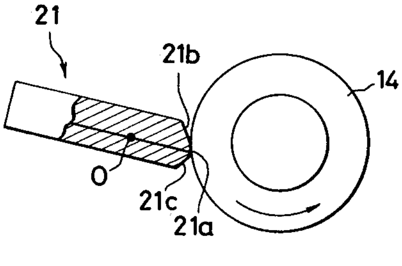
FIGS. 13 and 14 are schematic illustrations of the rotation of the recording electrode used in the recording apparatus of the invention.
Figure 14:
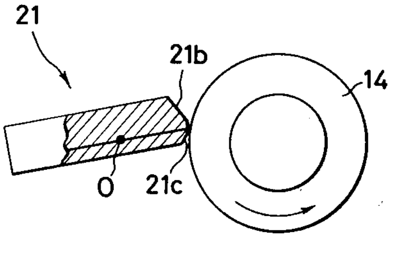

As shown in FIG. 13, when the recording electrode 21 is slightly rotated in a clockwise direction from its normal position illustrated in FIGS. 6 and 7, the first bevelled surface 21*b* of the electrode will be strongly held against the toner on the donor roller 14. By maintaining the donor roller 14 in rotation, any toner which is deposited on the first bevelled surface 21*b* of the recording electrode 21 will be rubbed away therefrom by the toner on the donor roller 14. Alternatively, when the recording electrode 21 is turned counterclockwise about the point O as shown in FIG. 14, any toner deposited on the second bevelled surface 21*c* will be again cleaned by the toner on the rotating donor roller 14. In this instance, the material used to form the surface of the donor roller 14 may be chosen to facilitate an adherence of toner thereto such as silicone rubber or the like. Thus, the toner adheres to the donor roller 14 in a stabilized manner, preventing a migration of the toner from the dornor roller 14 to the recording electrode 21 during the cleaning operation. During the cleaning operation, a voltage, which may be of a negative polarity, for example, may be applied to the doctor 11 to provide a charge injection to the toner, which assures an adherence of the toner to the donor roller 14 in a stabilized manner, more reliably preventing the migration of the toner from the donor roller 14 to the recording electrode 21.

Any toner which is deposited on the free end region of the recording electrode can be simply cleaned in a manner mentioned above. However, this cleaning operation cannot take place during the operation of the recording electrode 21 when charge injection to the toner occurs (or when an image is being formed). However, it will be appreciated that a recording apparatus of the type here disclosed has a number of time intervals during which the charge injection by the recording electrode 21 does not take place. Hence, such time intervals may be utilized to effect the cleaning operation. By way of example, when the recording apparatus shown in FIG. 7 is used together with a web of record paper 30, during the time the transfer of toner onto the web 30 does not take place, the transfer roller 39 is removed from the donor roller 14 so that the recording electrode 21 is not required to occupy its position shown in FIG. 7 during such time. Accordingly, such time interval may be utilized to cause an angular movement of the recording electrode 21 as illustrated in FIGS. 13 and 14, performing the cleaning operation. When a web of record paper is replaced by record sheets, the cleaning operation of the recording electrode can be performed during a time after a single record sheet has been moved out of the transfer station and before a next record sheet is fed into the transfer station. Of course, other times such as the setup interval of the recording apparatus may be used to effect the cleaning operation. The described cleaning operation may be periodically performed, or may be performed from time to time, as required.

Figure 15:
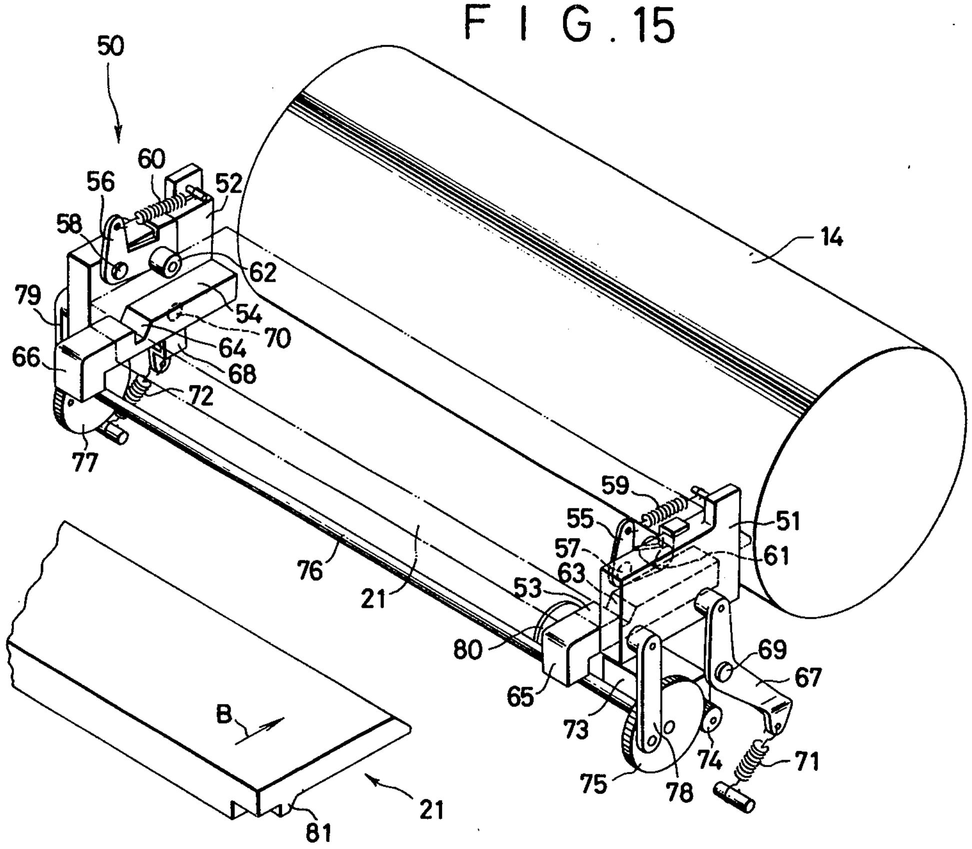
FIG. 15 is a schematic perspective view of one arrangement for rotating the recording electrode in the apparatus of the invention.

An arrangement which causes an angular movement of the recording electrode 21 as illustrated in FIGS. 13 and 14 in order to perform a cleaning operation may be implemented in various ways. For example, suitable drive means such as a solenoid, a hydraulic cylinder or an electric motor may be used to cause an angular movement of the recording electrode. Also, the electrode may be angularly driven. FIG. 15 shows a recording electrode holder unit which is provided with a specific arrangement to cause an angular movement of the recording electrode. In FIG. 15, a recording electrode holder unit 50 includes a pair of spaced and parallel holders 51, 52 on which electrode support members 53, 54 are fixedly mounted. A pair of rockable levers 55, 56 are pivotally mounted on pivot pins 57, 58 which are fixedly mounted in the surface of respective holders 51, 52. The levers 55 and 56 face each other, and are urged clockwise by tension springs 59, 60, respectively. Each of the rockable levers 55, 56 rotatably carries a holding roller 61, 62, respectively, which are urged against and hold the recording electrode 21. The electrode support members 53, 54 are each formed with detent grooves 63, 64 therein, the purpose of which will be descibed later, and knob-shaped projections 65, 66 are formed on the end face of the electrode support members 53, 54 which is remote from the donor roller 14.

A pair of rocking levers 67, 68 have their one end pivotally connected to the outside surface of the respective holders 51, 52 and are pivotally mounted on pivot pins 69, 70, respectively, which are secured to the frame of the machine. The other end of the rocking levers 67, 68 is engaged by one end of tension springs 71, 72, respectively, the other end of which is anchored to the frame of the machine. In this manner, the holders 51, 52 are urged to move clockwise, by the spring 71, 72.

A motor 73 is provided to drive the individual holders 51, 52, and comprises a step motor in the present example. A pinion 74 is fixedly mounted on the output shaft of the motor 53 and meshes with another gear 75, which is in turn fixedly mounted on a rotating shaft 76, the other end of which fixedly carries a disc 77. A pair of links 78, 79 have their one end pivotally connected to the gear 75 and the disc 77, respectively, at an eccentric point, and have their other end pivotally connected to the holders 51, 52. A pulse generator 80 is connected to the step motor 73.

In use, when the recording electrode 21 is mounted on the holder unit 50, as indicated in phantom line in FIG. 15, the tension of the springs 71, 72 cause the recording member to be held against the donor roller 14, although a toner layer is interposed in actuality. It is difficult to mount the recording electrode 21 on the holder unit 50 under this condition. Hence, the knobs 65, 66 are manually held initially to move the holders 51, 52 away from the donor roller 14 before the recording electrode 21 shown in solid line is moved in the direction of an arrow B. In this manner, the recording electrode 21 can be placed on the electrode support members 53,54 in a facilitated manner. At this time, a pair of hooks 81 (only one being shown in FIG. 15) formed on the recording electrode 21 are engaged with the detent grooves 63, 64 formed in the support members 53,54 and the holding rollers 61, 62 are urged against the recording electrode 21 under the resilience of the springs 59, 60. The recording electrode 21 is then carried by the holders 51, 52, as indicated by phantom line in FIG. 15. During the insertion of the recording electrode 21 into the holders 51, 52, the rockable levers 55, 56 move angularly against the resilience of the springs 59, 60, thus preventing an interference with the insertion of the recording electrode into position.

When the recording electrode 21 is carried by the holders 51, 52, the free end face 21*a* thereof will be held against the toner layer on the donor roller 14, as more specifically shown in FIG. 6 or 7. The springs 71, 72 act to urge the free end face 21*a* against the donor roller 14. The recording electrode 21 is then ready to effect a charge injection into the toner layer on the surface of the donor roller 14 as mentioned previously. The position assumed by the recording electrode at this time will be hereafter referred to as a first position.

Figure 16:
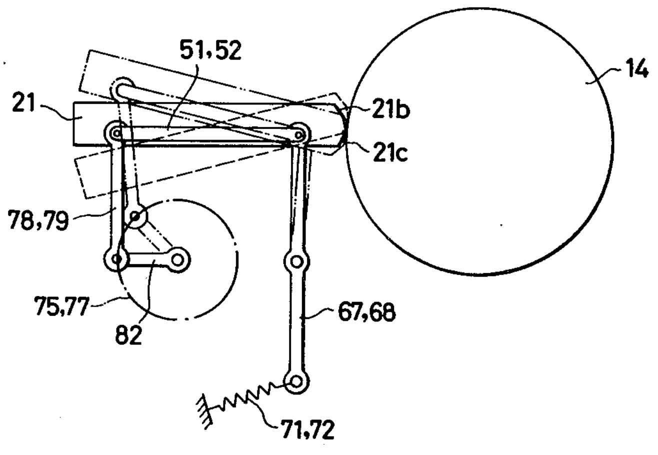
FIG. 16 is an illustration showing the operation of the arrangement shown in FIG. 15.

When the recording electrode 21 assumes the first position, the gear 75 and the disc 77 remain at rest at positions illustrated in FIG. 15. The relative position of various parts at this time is schematically shown in FIG. 16 as a linkage diagram. It will be appreciated that the linkage comprises a link 82 formed by the gear 75, the disc 77 and the frame of the machine (hereafter referred to as a base link), links 78, 79, a link formed by the holders 51, 52, and a link formed by the levers 67, 68. When the recording electrode 21 assumes the first position, the base link 82 remains at rest while the links 67, and 68 are urged by the springs 71, 72, respectively. Consequently, the recording electrode 21 which is carried by the links formed by the holders 51, 52 are held against the donor roller 14, as mentioned previously.

When a cleaning operation for the free end portion of the recording electrode 21 is desired, the motor 73 set in motion, thus rotating the gear 75 and the disc 77. While various manners of rotation are contemplated, it is assumed for the convenience of description that the gear 75 and the disc 77 initially rotate clockwise through a small angle, as viewed in FIG. 15. The angle through which these members rotate may be suitably chosen by an output signal from the pulse generator 80. As a result of a slight rotation of the gear 75, the base link 82 will move angularly to its phantom line position shown in FIG. 16. The links 51, 52 and the rocking levers 67, 68 then also move to their phantom line poisitions. As a result, the angular position of the recording electrode 21 relative to the donor roller 14 changes, and assumes a second position which is different from the first position, presenting the first bevelled surface 21*b* in opposing relationship with the donor roller 14. Since the rocking levers 67, 68 are urged clockwise by the springs 71, 72 at this time, the first bevelled surface 21*b* is strongly held against the toner layer on the donor roller 14. As mentioned previously in connection with FIG. 13, the rotation of the donor roller 14 allows the toner layer formed thereon to remove effectively any toner deposited on the first bevelled surface 21*b*.

By rotating the gear 75 and the disc 77 slightly in the opposite direction or counterclockwise through a small angle, the recording electrode 21 may be moved to its third position shown in broken lines in FIG. 16. In this instance, the second bevelled surface 21*c* of the recording electrode is held in abutment against the toner layer, which removes any toner deposited on the bevelled surface.

In the example described above, the gear 75 and the disc 77 are rotated in opposite directions to bring the respective bevelled surfaces of the recording electrode 21 into abutment against the toner layer on the donor roller. Alternatively, the gear 75 and the disc 77 may be continuously rotated in a given direction. In this instance, as the gear 75 rotates, the recording electrode 21 oscillates about the point O, representing the center of rotation thereof, and during one revolution of the gear 75, the recording electrode 21 passes through the second and the third position, shown in phantom line and broken lines, respectively, in FIG. 16, thus allowing the deposited toner to be cleaned.

While the motor is used to cause an angular movement of the recording electrode 21 in the arrangement shown in FIG. 15, the motor may be replaced by a solenoid or the like. However, since the use of a solenoid causes a rapid start and stop for the angular movement of the recording electrode 21, this may apply a relatively strong impact to the toner layer on the donor roller, thereby causing the toner to be removed from the donor roller. In this respect, the use of the motor with a reduction gearing connected to tis output assures a smooth start of motion of the recording electrode, avoiding the difficulty that the toner may be removed and fall down from the donor roller. Thus, the use of a motor as drive means is preferred.

In the embodiment shown in FIGS. 13 to 16, the recording electrode is arranged to move angularly about the point O which is spaced from the free end face 21*a* thereof in a direction away from the donor roller. Alternatively, it is also possible to cause an angular movement of the recording electrode about a apoint of abutment thereof against the toner layer on the donor roller. As a further alternative, the recording electrode may be subject to a translational movement from its first position, thereby changing the location on the recording electrode which abuts against the toner layer on the donor roller.

Figure 17:
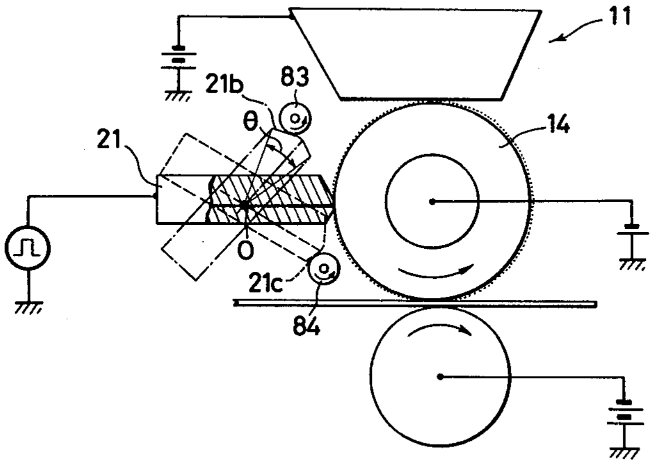
FIG. 17 is a schematic view illustrating another embodiment of the recording apparatus according to the invention in which a rotatable recording electrode is used.

Instead of removing any toner deposited on the free end region of the recording electrode by the toner layer on the donor roller as mentioned above, an independent cleaning member may be used to effect the cleaning operation of the recording electrode, as illustrated in FIG. 17. In this arrangement, the recording electrode 21 is again supported so that it can selectively assume a first position shown in solid line which is effective during the charge injection, and a second and a third position shown in phantom line and broken lines, respectively. When cleaning any toner deposited on the bevelled surface 21*b* of the recording electrode, the recording electrode 21 is caused to rotate counterclockwise about the center of rotation O, thus bringing it to its second position. Thereupon the bevelled surface 21*b* of the recording electrode 21 moves into abutment against a cleaning member 83 which is in the form of a roller. In this manner, any toner deposited on the bevelled surface 21*b* is cleaned by the cleaning member 83. The cleaning efficiency can be increased by causing an oscillation of the recording electrode 21 within a small angular extent $\theta$ when the electrode has reached the second position. Similarly, the cleaning member 83 may be rotated to achieve similar results.

A second cleaning member 84 may be disposed in a similar manner as the cleaning member 83. The first cleaning member 83 principally operates to clean the first bevelled surface 21*b*. When the recording electrode 21 is rotated to its third position shown in broken lines, it bears against the second cleaning member 84, which principally cleans the second bevelled surface 21*c*. The cleaning members 83, 84 may be formed of a material such as a felt material which exhibits a high toner cleaning efficiency. The configuration of the cleaning members is not limited to rollers, but may be in the form of flat plates.

Figure 18:
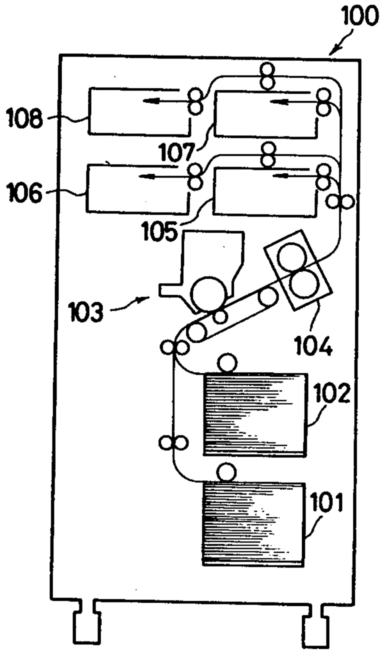
FIG. 18 is a schematic view of a shared printer incorporating the recording apparatus of the invention.
Figure 19:
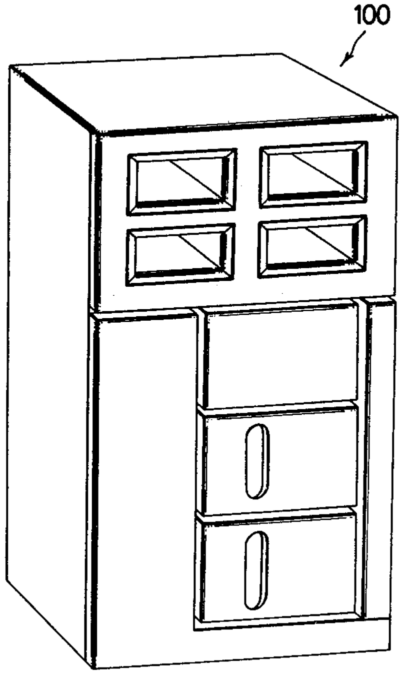
FIG. 19 is a perspective view of the shared printer shown in FIG. 18.

FIG. 18 is a schematic view of a printer 100 which utilizes the recording method according to the invention while FIG. 19 shows an appearance thereof. Record sheets of different sizes may be selectively fed from a pair of paper feeders 101, 102 to pass through a unit 103 which is provided to carry out the recording method of the invention in order for a toner image recorded thereon. Subsequently, the sheet is passed through a fixing unit 104 where the toner image is permanently fixed on the record sheet, and then is fed into a given one of a plurality of stackers 105, 106 and 107, 108. Thus, the printer 100 is provided with the plurality of stackers so that each print-out for a plurality of operations is processed page by page and is delivered to a different stacker for each operation. A common form may be used for each operation by storing formats, letterheads or the like as fixed data so as to be combined with variable data. Such printer will be referred to as a shared printer having a multi-stacker, or simply as a shared printer.

Figure 20:
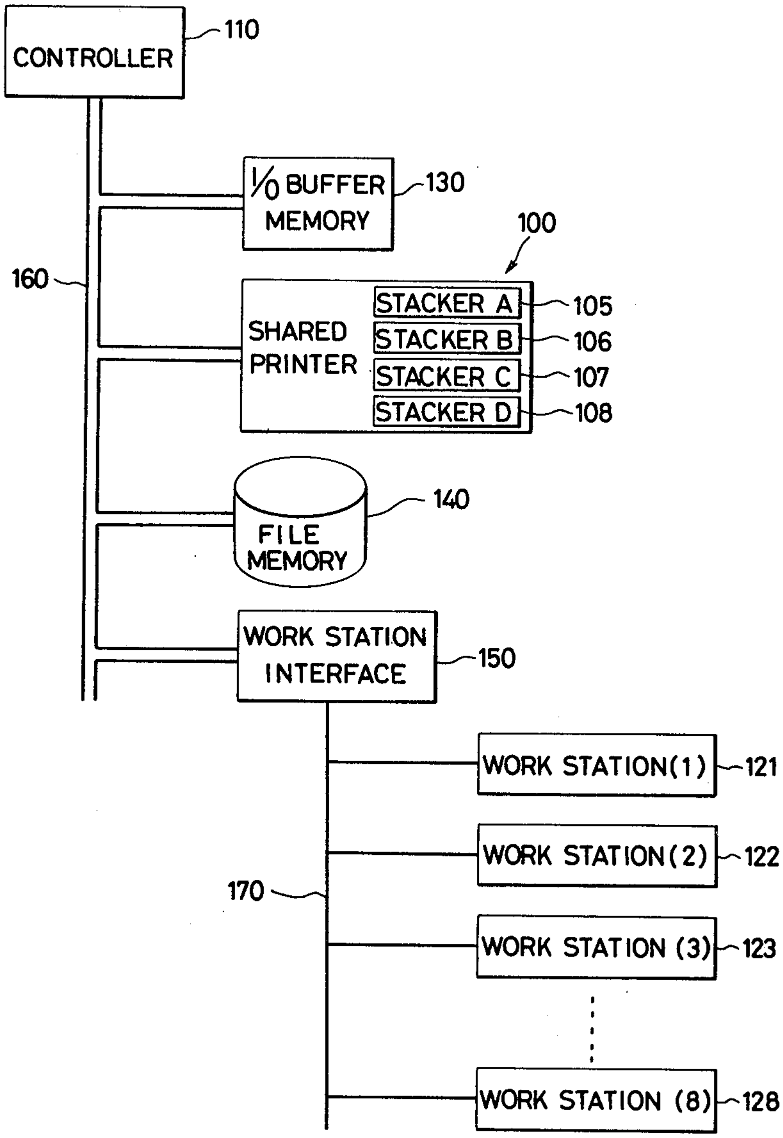
FIG. 20 is a block diagram of a word processing cluster system incorporating the shared printer shown in FIG. 18.

FIG. 20 shows one form of a word processing cluster system which utilizes such a shared printer 100. A single controller 110 is connected to a plurality of work stations 121, 122, 123, . . . 128 so that one or a plurality of work stations may be used in connection with several different jobs. In a conventional system, a single printer is usually employed, so that every data must be stored in a file memory so that it may be printed out for each operation upon completion of an input operation by the work stations, or the data is printed out page by page for all the operations to be sunsequently sorted manually into the individual operations. By contrast, the system utilizing the shared printer 100 permits printouts for each operation to be delivered into different stackers, thus improving the operational efficiency. Such system has its optimum application to a word processing cluster system or a combined data processing/word processing system since often different operations are required for individual terminals in the word processing application.

In FIG. 20, the controller 110 controls the overall operation of the system, and an I/O buffer memory 130 provides a temporary storage of document data which is to be printed out by the shared printer 100. A file memory 140 stores overlay form and other fixed forms used in the shared printer as well as the individual work stations, document data to be printed out by the shared printer, and system logging data. A work station interface 150 is provided between a high speed bus line 160 and a low speed bus line 170.

The relationship between the individual work stations and the individual stackers of the shared printer 100 will now be described. There are three schemes as mentioned below.

(1) Fixed Scheme

In this scheme, work stations 121 and 122 are associated with the stacker 105, work stations 123 and 124 are associated with the stacker 106, and so on. In this manner, selected work stations are fixedly associated with one of stackers.

(2) Programmed Scheme

In this scheme, any one of stackers which are not in use is designated by a particular work station. Alternatively, the stacker is automatically designated in a sequential manner starting from the stacker 105. Where no vacant stacker is available, the document data is stored in the file memory 140 until a vacant stacker is available, whereupon it is fed for print-out to a particular stacker either in response to an instruction from a particular work station or automatically. At this end, each of the stackers is provided with means for detecting an overflow and means for confirming that a printout is received in the particular stacker. When an overflow is detected, the document data is obviously stored in the file memory 140. In addition, a particular stacker, for example, stacker 108 may be designated as a shared one so that when it can be utilized whenever no vacant stacker is available. The document data which are stored in the file memory 140 may be automatically erased after the print-out.

(3) Job Dispatch Scheme

In this scheme, the number of a job which is performed by a particular work station is supplied, thus automatically dispatching a stacker in accordance with each job. Where no vacant stacker is available, remedy is made as mentioned above in connection with the programmed scheme.

While the invention has been disclosed herein in terms of specific embodiments, it should be understood by those skilled in the art that a number of changes and modifications can be made therein without departing from the scope and spirit of the invention. Therefore, it is intended that the scope of the invention be solely defined by the appended claims.

What is claimed is:

1. An image recording method including the steps of forming a uniform and thin toner layer on the surface of a moving donor member, bringing the toner layer into contact with a recording electrode to which a pattern signal is applied to form a charge pattern in the toner layer in accordance with the pattern signal, and bringing a record medium into superimposed relationship with the toner layer having the charge pattern and transferring toner having the charge pattern onto the record medium; wherein the step of forming a uniform and thin toner layer on the surface of the donor member takes place by utilizing an applicator disposed close to or in contact with the surface of the donor member and includes applying a voltage between the applicator and the donor member, and further wherein the surface of said donor member has a resistance sufficient to prevent the charge applied to said toner layer from appreciably leaking from said toner layer.

2. An image recording method according to claim 1, further including the step of removing any toner deposited on the surface of the donor member before the step of forming a thin uniform toner layer on the surface of the donor member.

3. An image recording apparatus comprising a moving donor member, an applicator disposed close to or in contact with the surface of the donor member for forming a uniform and thin toner layer on the donor member, means for applying a voltage across the applicator and the donor member, a recording electrode disposed in contact with the surface of the donor member and adapted to have a pattern signal applied thereto for defining on the toner layer formed on the donor member a charge pattern in accordance with the pattern signal, and means including a transfer roller disposed in contact with the surface of the donor member for transferring toner having the charge pattern onto a record medium disposed between the donor member and the transfer roller, the surface of said donor member having a resistance sufficient to prevent the charge applied to said toner layer from leaking appreciably from said toner layer.

4. An image recording apparatus according to claim 3 in which the donor member includes at least two layers, the surface layer having a volume resistance which is higher than that of its underlying layer.

5. An image recording apparatus according to claim 3 in which the toner carrier of the applicator comprises a sleeve formed of a non-magnetic meterial and a magnet disposed inside the sleeve and wherein the toner comprises either a magnetic toner or a non-magnetic toner admixed with a magnetic carrier.

6. An image recording apparatus according to claim 3, further including a cleaning member disposed intermediate the transfer roller and the applicator for removing any toner remaining on the donor member after the transfer step.

7. An image recording apparatus according to claim 3 in which the surface of the recording electrode which is adapted to contact the toner layer carries a plurality of individual electrodes and is formed of a material which is spaced from the material of the toner in the triboelectric series so as to charge the toner layer to the opposite polarity from the polarity of charge contributing to image formation.

8. An image recording apparatus according to claim 3, wherein the surface of the recording electrode adapted to contact the toner layer carries a plurality of individual electrodes, and means including an auxiliary electrode is additionally provided for charging the toner layer to the opposite polarity of charging by the recording electrode.

9. An image recording apparatus according to claim 3 wherein said recording electrode has a tapered forward end portion.

10. An image recording apparatus according to claim 3, including means for pivoting the forward end portion of said recording electrode relative said donor member for removing any build up of toner on said recording electrode.

11. An image recording apparatus according to claim 3, the surface of said donor member being formed of a rubber material.

12. An image recording apparatus according to claim 11, said rubber material being made partly conductive and having a volumn resistance of at least approximately $10^3$ ohm-cm.

* * * * *